United States Patent
Taguchi et al.

[19]

[11] Patent Number: 5,913,535
[45] Date of Patent: Jun. 22, 1999

[54] MANUFACTURING METHOD FOR AIR BAG AND AIR BAG DEVICE FOR A PASSENGER

[76] Inventors: Masahiro Taguchi; Tomoji Suzuki; Shoichi Yamanaka, all of c/o Nippondenso Co.,Ltd. 1—1 Showa-cho, Kariya-city, Aichi-pref., Japan

[21] Appl. No.: 08/694,825

[22] Filed: Aug. 9, 1996

[30] Foreign Application Priority Data

Aug. 11, 1995 [JP] Japan .................................. 7-205575

[51] Int. Cl.[6] .................................................. B60R 21/24
[52] U.S. Cl. ........................................ 280/729; 280/743.1
[58] Field of Search .................................... 280/729, 740, 280/743.1, 742, 736

[56] References Cited

U.S. PATENT DOCUMENTS

| | | | |
|---|---|---|---|
| 5,249,824 | 10/1993 | Swann et al. | 280/729 |
| 5,310,216 | 5/1994 | Wehner et al. | 280/743.1 |
| 5,566,972 | 10/1996 | Yoshida et al. | 280/743.1 |
| 5,664,805 | 9/1997 | Yoshida et al. | 280/743.1 |

FOREIGN PATENT DOCUMENTS

| | | | |
|---|---|---|---|
| 4121659 | 1/1993 | Germany | 280/736 |
| 3-281460 | 12/1991 | Japan | 280/729 |
| 7-156731 | 6/1995 | Japan . | |
| 2 265 118 | 9/1993 | United Kingdom . | |

*Primary Examiner*—Eric D. Culbreth

[57] ABSTRACT

The present invention provides a manufacturing method for an air bag which can simply form an inner bag inside a outer bag. Cloth members of the inner bag are mounted within the outer bag and the outer bag is sewn together along its peripheries except its folded portion and a gas inlet hole for introducing gas from an inflator, by using threads. Thereafter the cloth members of the inner bag are put into the outer bag, and the cloth members of the inner bag are pulled out of the outer bag through the gas inlet hole. Thereafter, the cloth members of the inner bag are sewn together along their peripheries by using a thread. Thus, the cloth members of the inner bag are formed into a bag. Finally, putting the inner bag into the outer bag makes the air bag completed.

7 Claims, 9 Drawing Sheets

FIG. 2A
FIG. 2B
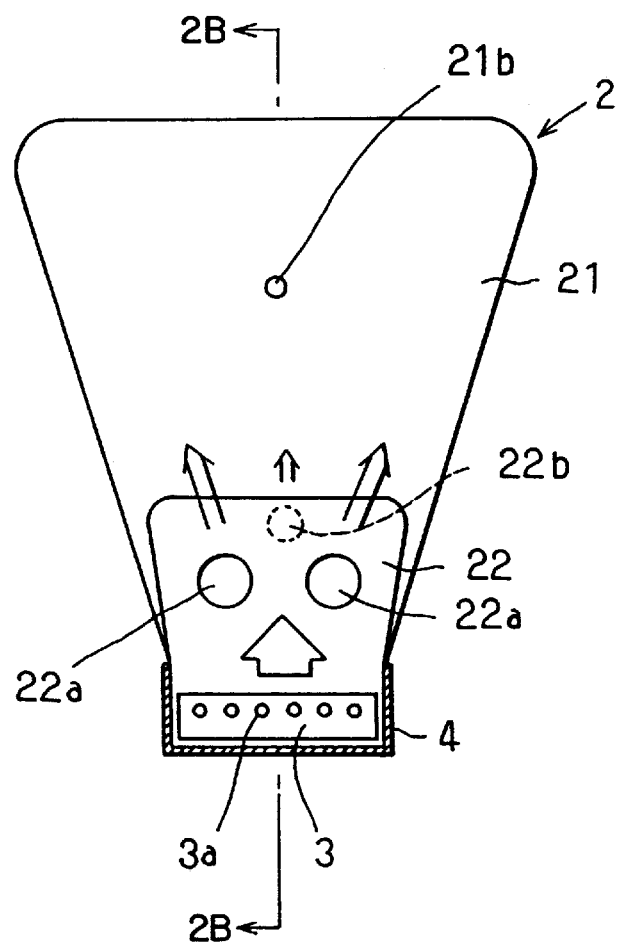
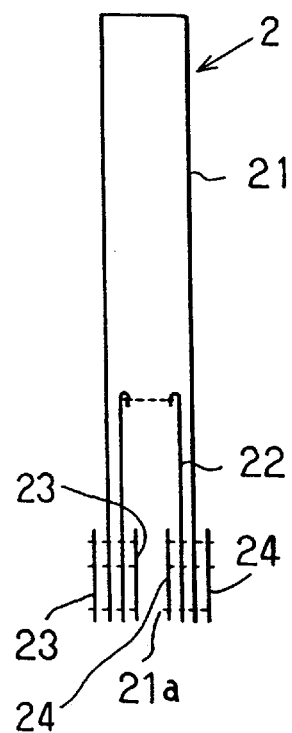

FIG. 5A
FIG. 5B
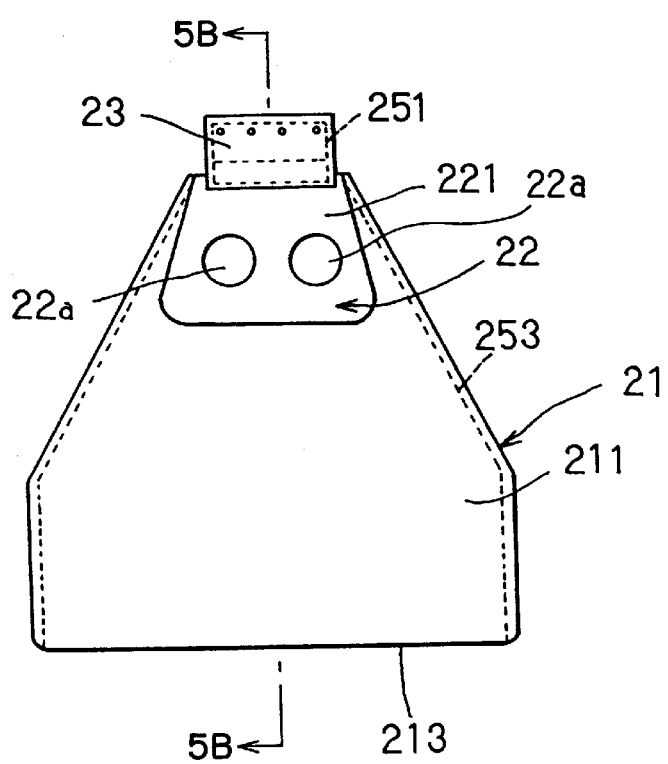
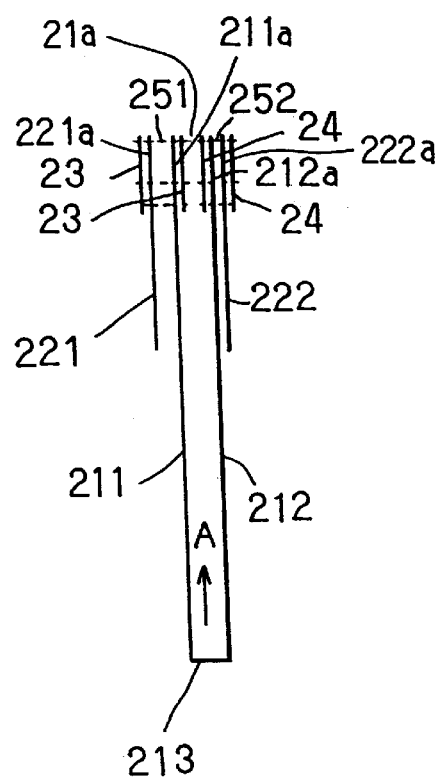

MANUFACTURING METHOD FOR AIR BAG AND AIR BAG DEVICE FOR A PASSENGER

BACKGROUND OF THE INVENTION

1. Field of the Invention

The present invention relates to a manufacturing method for an air bag in an air bag device operated upon collision of a vehicle to absorb the shock to a passenger in the vehicle and thereby protect the passenger.

2. Description of Related Art

A conventional air bag device is described in JP-A-5-262195. In this air bag device, when gas is ejected from an inflator, an inner bag is expanded by the gas from the inflator and a bag body is expanded by the gas from the inner bag. That is, the gas from the inflator is guided through apertures of the inner bag to enter the bag body and expand it vertically.

In the conventional air bag, the inner bag is required to be put in the bag body. However, steps for sewing the inner bag and the bag body are not well determined, and a sewing device for the inner bag and the bag body is necessarily complicated.

SUMMARY OF THE INVENTION

It is accordingly an object of the present invention to provide a manufacturing method for an air bag which can easily form an inner bag inside a bag body.

According to a first aspect of the present invention, the above object is achieved by providing a manufacturing method for an air bag in an air bag device which has a gas generating device for generating gas upon collision, an inner bag being supplied with the gas from the gas generating device and be expanded to deflect a flow of the gas from the gas generating device, and a bag body communicating with the inner bag to receive the gas from the inner bag and be expanded by the gas toward the passenger.

According to another aspect of the present invention, the above object is achieved by providing a manufacturing method including a first step of sewing a cloth member of the inner bag to a cloth member of the bag body in the vicinity of a gas inlet hole of the bag body communicating with the gas generating device, a second step of sewing the cloth member of the bag body along a periphery thereof to obtain a bag condition, a third step of passing the bag body through the gas inlet hole to turn over the bag body, a fourth step of sewing the cloth member of the inner bag along a periphery thereof to obtain a bag condition, and a fifth step of putting the inner bag in the bag condition into the bag body through the gas inlet hole.

Accordingly, the sewing of the inner bag and the bag body can be carried out from the same side, thereby making the sewing easy.

BRIEF DESCRIPTION OF THE DRAWINGS

Additional objects and advantages of the present invention will be more readily apparent from the following detailed description of preferred embodiments thereof when taken together with the accompanying drawings, in which:

FIG. 2A is an elevational view of the air bag shown in FIG. 1 in the condition where it is taken out of a case;

FIG. 2B is a partial cross-sectional schematic illustration of FIG. 2A;

FIG. 5A is an elevational view showing a first step of a manufacturing method for the air bag according to the first embodiment;

FIG. 5B is a partial cross-sectional schematic illustration of FIG. 5A;

DETAILED DESCRIPTION OF PRESENTLY PREFERRED EMBODIMENTS

Figure 1:
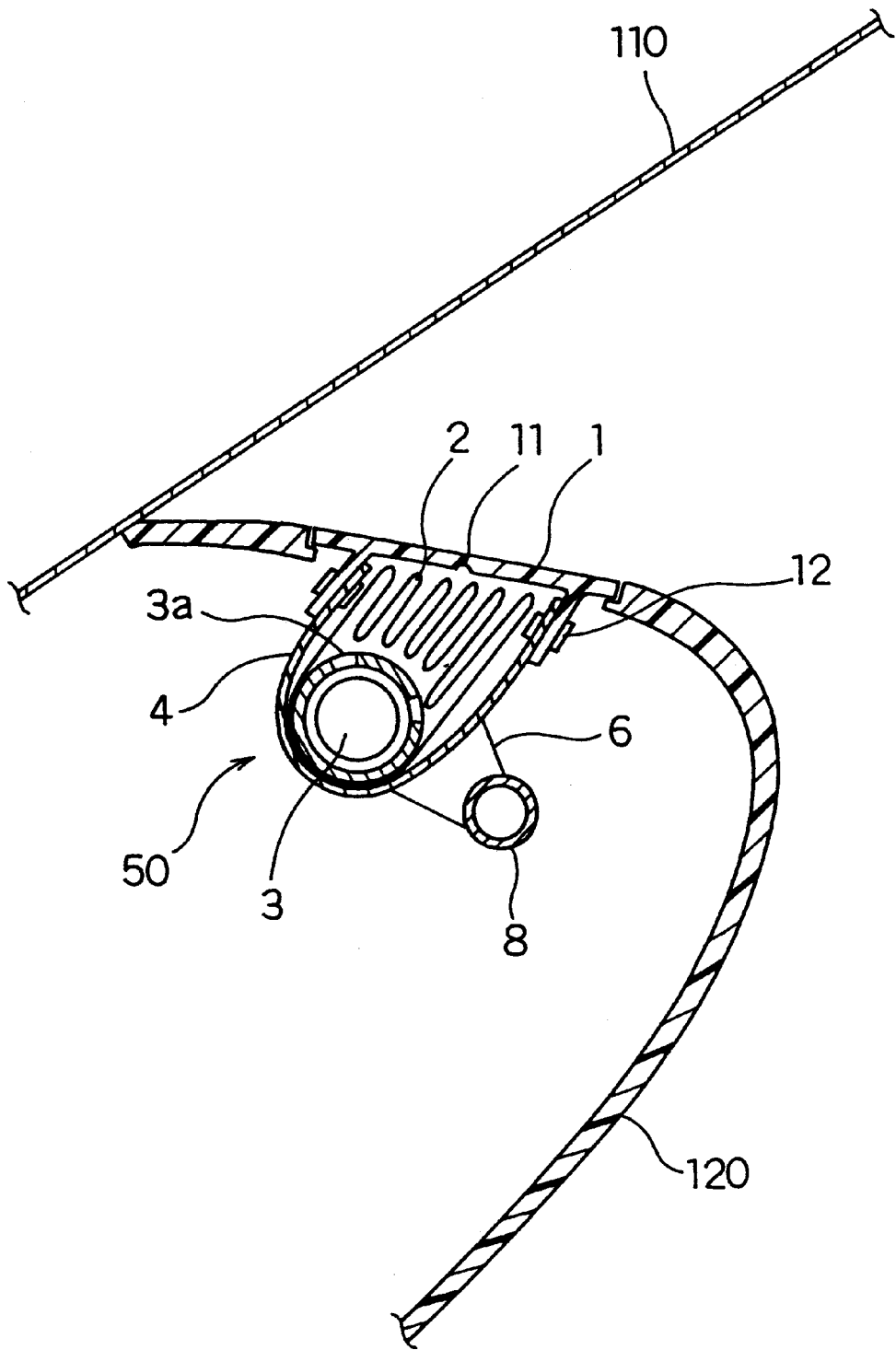
FIG. 1 is a partial cross-sectional view of an air bag device according to a first embodiment of the present invention.

Preferred embodiments of the present invention are hereinafter described with reference to the accompanying drawings.

The configuration of an air bag device 50 according to a first embodiment of the present invention will now be described with reference to FIGS. 1 to 4.

The air bag device 50 is composed generally of a lid 1, an air bag 2, an inflator 3, and a case 4. The lid 1 normally covers the case 4, and the air bag 2 and the inflator 3 are normally enclosed in the case 4. The lid 1 is formed with a breakable lip line 11 as a thin-walled portion. The lid 1 is fixed to the case 4 by a plurality of rivets 12.

The inflator 3 is cylindrical, and it is fastened to the case 4 by nuts (not shown). The cylindrical surface of the inflator 3 is formed with a plurality of gas outlet holes 3a.

As shown in FIGS. 2A and 2B, the air bag 2 has a bag body 21 adapted to be supplied with gas from the inflator 3 and expanded by the gas supplied. The bag body 21 is formed with a gas inlet hole 21a communicating with the inflator 3.

An inner bag 22 is mounted within the bag body 21 through a plurality of reinforcing cloth members 23 and 24 to surround and reinforce the gas inlet hole 21a of the bag body 21.

The bag body 21 has a through-hole 21b for gradually releasing the gas supplied in the bag body 21 to the outside thereof.

The inner bag 22 is formed with a pair of first through-holes 22a arranged at adjacent positions and having substantially the same opening area, and a second through-hole 22b arranged on the side opposite to the first through-holes 22a and having an opening area smaller than that of the first through-holes 22a.

Figure 3:
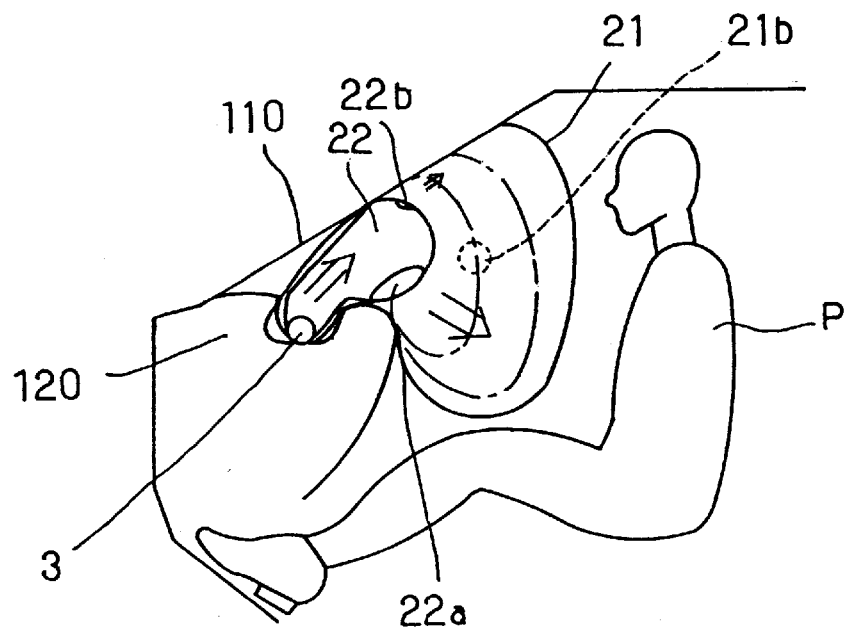
FIG. 3 is a schematic side view illustrating an expanded condition of the air bag.

As shown in FIG. 3, the first through-holes 22a of the inner bag 22 are formed at such positions that when the inner bag 22 is expanded by the gas from the inflator 3, the first through-holes 22a are not closed by an instrument panel 120 of a vehicle and become opposed to the waist of a passenger P in the vehicle. The second through-hole 22b of the inner bag 22 is formed at such a position that when the inner bag 22 is expanded by the gas from the inflator 3, the second through-hole 22b comes to an upper front end of the inner bag 22 to allow the released gas to flow along the inner surface of a windshield 110 of the vehicle.

As shown in FIG. 1, the case 4 of the air bag device 50 is fixed to a stay 6 by a plurality of bolts or the like (not shown), and the stay 6 is fixed to a mounting portion 8 inside the instrument panel 120 by means of bolts (not shown). Thus, the air bag device 50 is mounted inside the instrument panel 120 at its upper portion.

The operation of the air bag device 50 will now be described.

When the gas is generated by the inflator 3 upon collision of the vehicle, the air bag 2 is expanded by the gas supplied from the inflator 3. At this time, the thin-walled lip line 11 of the lid 1 is broken by the pressure of the gas expanding the air bag 2, so that the air bag 2 is allowed to come out of the case 4 and be expanded by the gas.

During the expansion of the air bag 2, the gas from the inflator 3 is first supplied to the inner bag 22 to expand it. Then, the gas supplied to the inner bag 22 is discharged from the first through-holes 22a and the second through-hole 22b. At this time, a larger amount of the gas is discharged from the first through-holes 22a than from the second through-hole 22b, because the opening area of the former is larger than that of the latter as shown in FIGS. 2A, 2B, and 3. Accordingly, the bag body 21 is expanded by the gas discharged from the first through-holes 22a of the inner bag 22 toward the waist of the passenger P. At the same time, the bag body 21 is expanded by the gas discharged from the second through-hole 22b of the inner bag 22 along the inner surface of the windshield 110 toward the head of the passenger P.

Accordingly, under the fully expanded condition of the bag body 21 as shown by the solid line in FIG. 3, there is almost no interference between the windshield 110 and the expansion of the air bag 2, and the air bag 2 largely projects toward the waist of the passenger P.

Figure 4:
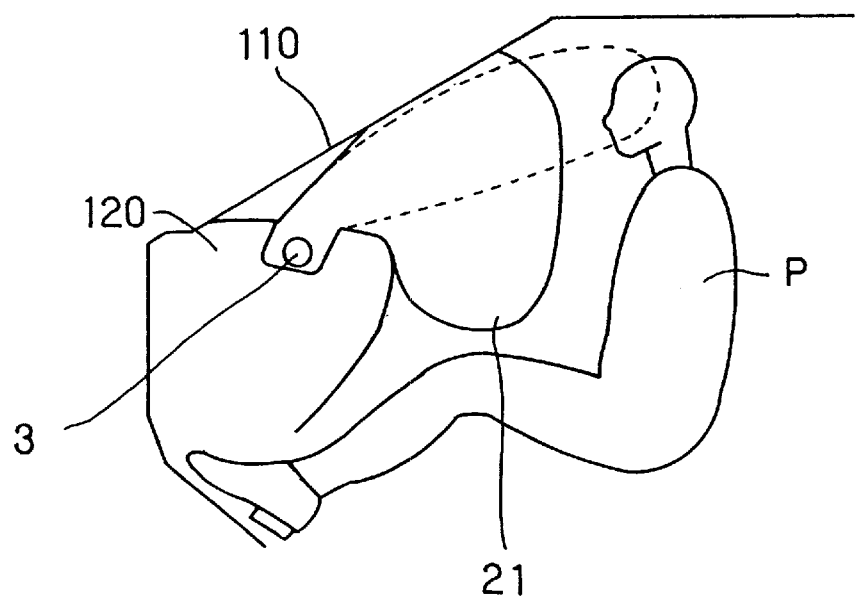
FIG. 4 is a view similar to FIG. 3, illustrating phantom expansion of the air bag.

That is, there is no possibility that the air bag 2 of the air bag device 50 located at the upper portion of the instrument panel 120 may be linearly expanded toward the head of the passenger P to hit the face or the like of the passenger P as shown by the broken line in FIG. 4. Thus, possible harm of the air bag 2 upon its expansion against the passenger P can be suppressed. Further, the degree of freedom of size and shape of any other parts mounted in the instrument panel 120 can be increased. For example, the size of a glove compartment frequently formed at a central portion of the instrument panel 120 can be made enough large.

Further, with a simple configuration such that the inner bag 22 has the first through-holes 22a and the second through-hole 22b at certain positions, interference between the windshield 110 and the air bag 2 upon its expansion can be almost eliminated to allow quick expansion of the air bag 2 toward the passenger P. Accordingly, a space between the passenger P and interior parts such as the instrument panel 120 can be quickly filled with the expanded air bag 2.

A manufacturing method for the air bag 2 will now be described with reference to FIGS. 5A to 8B. FIGS. 5B, 6B, 7B and 8B are partial cross-sectional schematic illustrations taken along the vertical center lines of FIGS. 5A, 6A, 7A and 8A, respectively.

As shown in FIGS. 5A and 5B, the bag body 21 is formed from a single reinforced cloth, and this cloth is folded at its transverse center. That is, the bag body 21 has a folded portion 213, a pair of first and second body portions 211 and 212 each having a substantially trapezoidal shape extending upward from the folded portion 213 and then tapering toward the top side, and a pair of first and second rectangular projecting portions 211a and 212a respectively projecting from the top sides of the first and second body portions 211 and 212.

On the other hand, the inner bag 22 is composed of a pair of first and second cloth members 221 and 222 each having a substantially trapezoidal shape, and a pair of first and second rectangular projecting portions 221a and 222a A respectively formed at the top sides of the first and second cloth members 221 and 222. The first and second projecting portions 221a and 222a of the inner bag 22 are the same in size and shape as the first and second projecting portions 211a and 212a of the bag body 21. The first through-holes 22a of the inner bag 22 are formed at adjacent positions through the first cloth member 221.

In this embodiment, the plural reinforcing cloth members 23 and 24 of the air bag 2 are constructed of a pair of first reinforcing cloth members 23 sewn to the first projecting portions 211a and 221a of the bag body 21 and the inner bag 22, and a pair of second reinforcing cloth members 24 sewn to the second projecting portions 212a and 222a of the bag body 21 and the inner bag 22. The first and second reinforcing cloth members 23 and 24 are substantially the same in size and shape as the first and second projecting portions 211a and 212a of the bag body 21 and the first and second projecting portions 221a and 222a of the inner bag 22.

In sewing the bag body 21, the inner bag 22 and the first and second reinforcing cloth members 23 and 24, the bag body 21 as a single cloth is preliminarily developed. In this condition, the first and second projecting portions 221a and 222a of the first and second cloth members 221 and 222 of the inner bag 22 are placed in registration on the first and second projecting portions 211a and 212a of the bag body 21, respectively, and the first and second cloth members 221 and 222 are placed on the opposite end portions of the first and second body portions 211 and 212 of the bag body 21. Thereafter, the first reinforcing cloth members 23 are placed to sandwich the first projecting portion 211a of the bag body 21 and the first projecting portion 221a of the inner bag 22. In this condition, the first projecting portion 211a of the bag body 21, the first projecting portion 221a of the inner bag 22, and the first reinforcing cloth members 23 are sewn together along their outlines by using a thread 251 (see FIG. 5B). Similarly, the second reinforcing cloth members 24 are placed to sandwich the second projecting portion 212a of the bag body 21 and the second projecting portion 222a of the inner bag 22. In this condition, the second projecting portion 212a of the bag body 21, the second projecting portion 222a of the inner bag 22, and the second reinforcing cloth members 24 are sewn together along their outlines by using a thread 252 (see FIG. 5B).

Thereafter, the bag body 21 is folded along the folded portion 213 to face in registration the first projecting portion 211a of the bag portion 21, the first projecting portion 221a of the first cloth member 221 of the inner bag 22, and the first reinforcing cloth members 23 sewn together to the second projecting portion 212a of the bag portion 21, the second projecting portion 222a of the second cloth member 222 of the inner bag 22, and the second reinforcing cloth members 24 sewn together.

Thereafter, as shown in FIG. 5A, the first and second body portions 211 and 212 of the bag body 21 are sewn together along their outlines except the folded portion 213 and the gas inlet hole 21a for introducing the gas from the inflator 3, by using threads 253. Thus, the single cloth of the bag body 21 is formed into a bag.

Figure 6A:
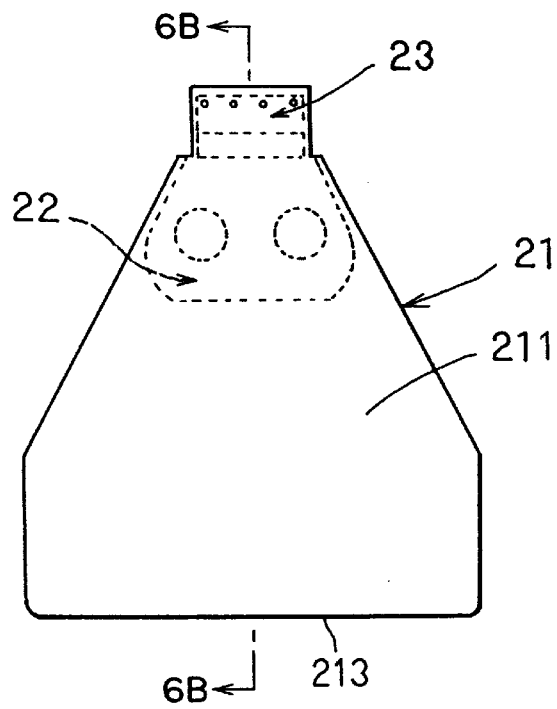
FIG. 6A is an elevational view showing a second step of a manufacturing method for the air bag according to the first embodiment.
Figure 6B:
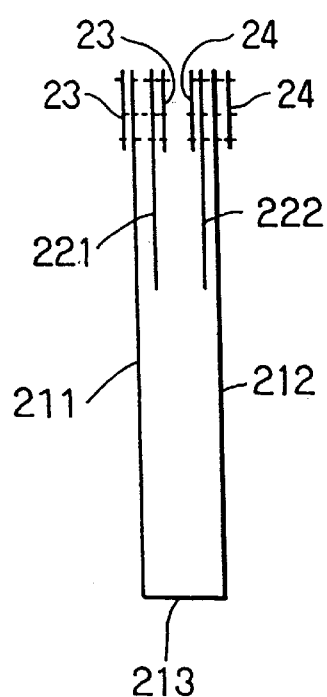
FIG. 6B is a partial cross-sectional schematic illustration of FIG. 6A.

Thereafter, the folded portion 213 of the bag body 21 is pulled up in the direction of the arrow A shown in FIG. 5B to pass the first and second body portions 211 and 212 through the gas inlet hole 21a, thereby putting the first and second cloth members 221, and 222 of the inner bag 22 into the bag body 21 as shown in FIGS. 6A and 6B. In this condition, the threads 253 appearing along the outline of the bag body 21 can be concealed inside the bag body 21. Accordingly, the threads 253 and an edge of the bag body 21 do not appear on the outer surface of the bag body 21, thereby eliminating possible harm by the threads 253 or the edge of the bag body 21 against the passenger P.

Figure 7A:
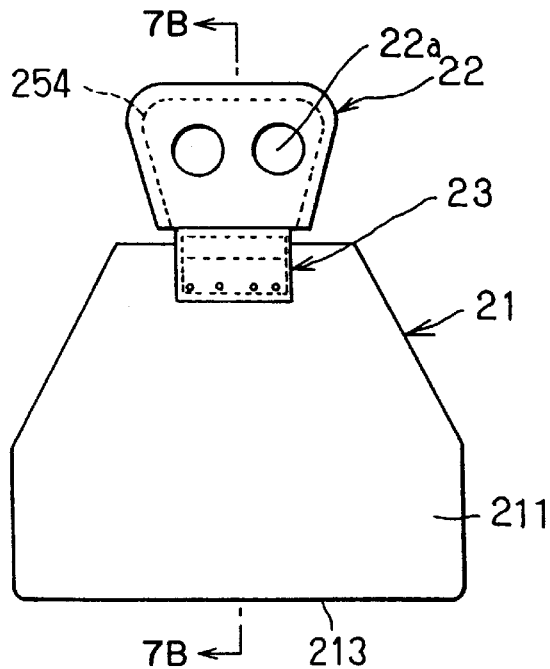
FIG. 7A is an elevational view showing a third step of a manufacturing method for the air bag according to the first embodiment.
Figure 7B:
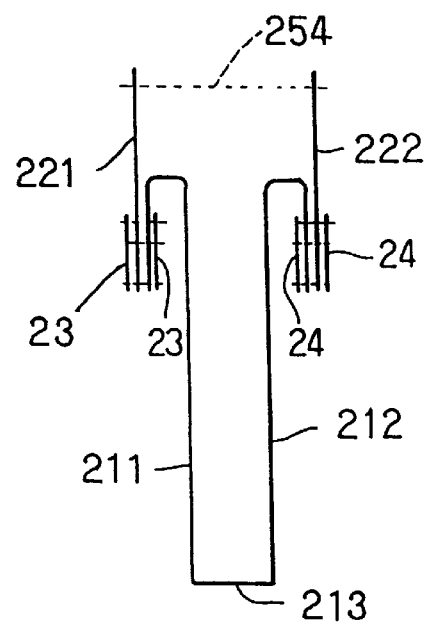
FIG. 7B is a partial cross-sectional schematic illustration of FIG. 7A.

Thereafter, the first and second cloth members 221 and 222 of the inner bag 22 are pulled out of the bag body 21 through the gas inlet hole 21a as shown in FIGS. 7A and 7B. Thereafter, the first and second cloth members 221 and 222 of the inner bag 22 are placed in registration and then sewn together along their outlines except the gas inlet hole 21a, by using a thread 254. Thus, the first and second cloth members 221 and 222 of the inner bag 22 are formed into a bag.

Figure 8A:
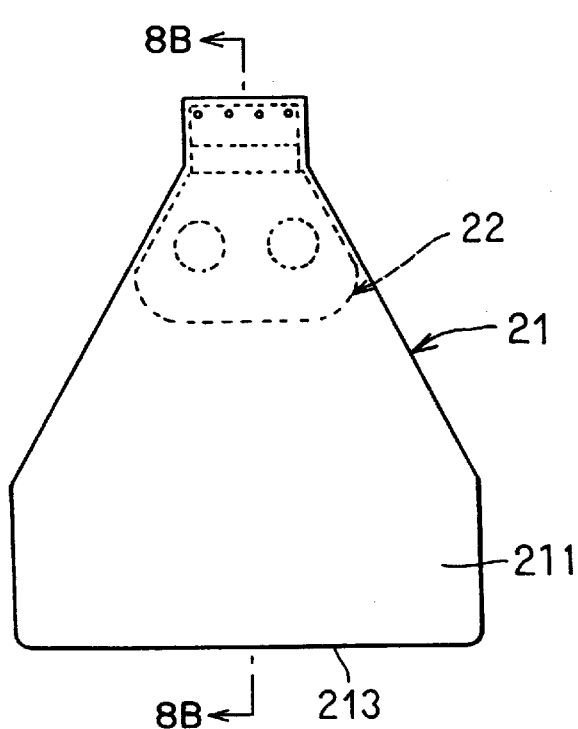
FIG. 8A is an elevational view showing a-fourth step of a manufacturing method for the air bag according to the first embodiment.
Figure 8B:
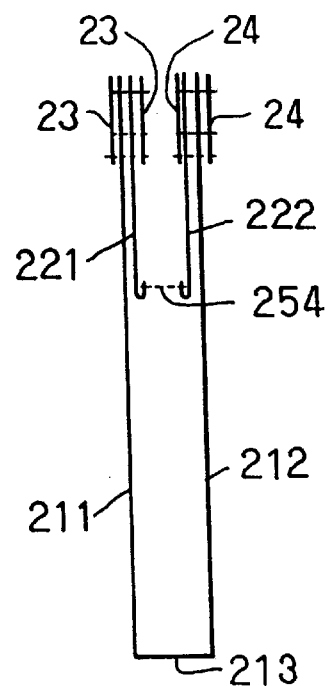
FIG. 8B is a partial cross-sectional schematic illustration of FIG. 8A.

Finally, the inner bag 22 is put into the bag body 21 through the gas inlet hole 21a as shown in FIGS. 8A and 8B. Thus, the air bag 2 is completed.

According to the above manufacturing method for the air bag 2, the bag body 21 and the inner bag 22 can be surely sewn together at their outer peripheries, and the inner bag 22 can be easily formed inside the bag body 21 without using any special sewing device.

Figure 9:
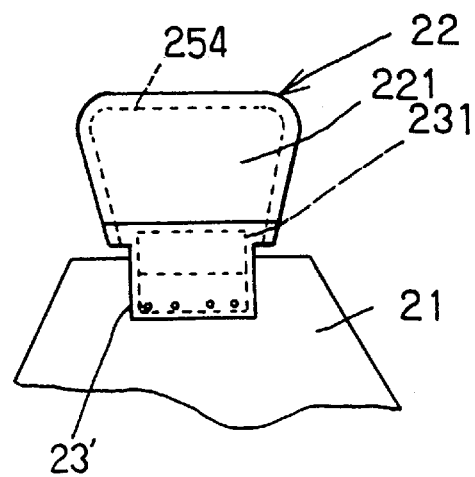
FIG. 9 is an elevational view of a part of an air bag, showing a modification of the first embodiment.

FIG. 9 shows a modification of the first embodiment. In this modification, a first reinforcing cloth member 23' and a second reinforcing cloth member (not shown) are different in shape from the first and second reinforcing cloth members 23 and 24 shown in FIGS. 5A and 5B because the first reinforcing cloth member 23' and the second reinforcing cloth member respectively have an extended portion 231 and another extended portion (not shown) corresponding to parts of the first and second cloth members 221 and 222 of the inner bag 22. The extended portions of the reinforcing cloth members are also sewn by the thread 254 to the first and second cloth members 221 and 222 of the inner bag 22, thereby improving the strength of the inner bag 22 near the gas inlet hole 21a.

Although the bag body 21 is formed by folding a particular form of single cloth along its transverse center in the first embodiment, the form of the bag body in the present invention is not limited to such a form as shown for the first embodiment.

Figure 10:
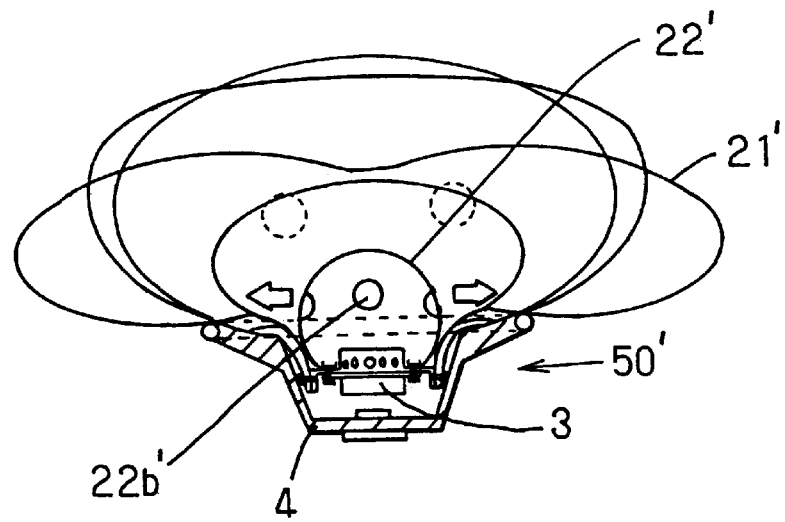
FIG. 10 is a cross-sectional schematic view of an air bag device according to a second embodiment of the present invention.
Figure 11:
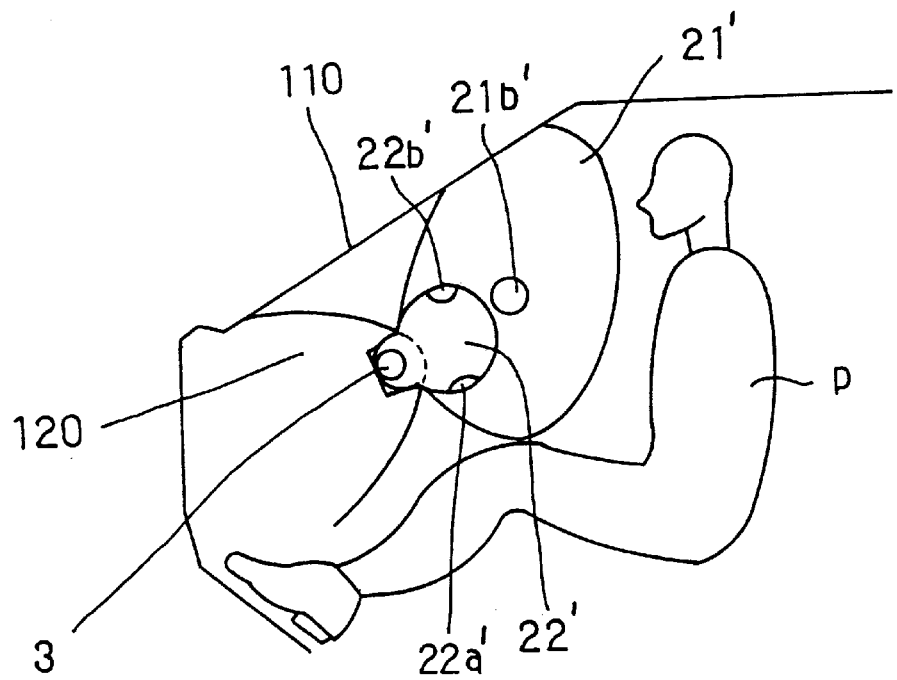
FIG. 11 is a schematic side view illustrating an expanded condition of the air bag shown in FIG. 10.

FIGS. 10 and 11 show a second preferred embodiment of the air bag device according to the present invention. In this preferred embodiment, an air bag device 50' is located in a steering wheel (FIG. 10) or at an outer central portion of the instrument panel 120 (FIG. 11) rather than at the upper portion thereof as described in the first embodiment. An inner bag 22' is formed with the first through-holes 22a' which are opposed to the knee of a passenger P and the second through hole 22b' which is opposed to a windshield 110 in the expanded condition of the air bag. Accordingly, when the inner bag 22' is expanded, a bag portion 21' is expanded vertically along the position of the passenger P, so that partial projection of the bag body 21' can be suppressed to allow reliable protection of the upper body of the passenger P.

A manufacturing method for the air bag according to the second embodiment will now be described with reference to FIGS. 12A to 15B. FIGS. 12B, 13B, 14B, and 15B are sectional schematic illustrations taken along the vertical center lines of FIGS. 12A, 13A, 14A, and 15A, respectively.

The bag body 21' is composed of circular first and second body portions 211' and 212' having the same size. The first body portion 211' is formed at its center with a circular gas inlet hole 21a' for introducing the gas from the inflator 3', and at its outer circumferential portion with a pair of through-holes 21b' for gradually releasing the gas supplied into the bag body 21' to the outside thereof.

The inner bag 22' is formed from a single rectangular cloth member 221'. The cloth member 221' is formed at one end portion with a pair of through-holes 22a', and at a portion between the center and the other end portion with a circular gas inlet hole 22c' having the same size as that of the gas inlet hole 21a' of the bag body 21'.

Two ring-shaped first reinforcing cloth members 23" are provided in a stacked condition around the gas inlet hole 22c' of the inner bag 22', and two ring-shaped second reinforcing cloth members 24' are individually provided around the two through-holes 21b' of the bag body 21'.

In sewing the bag body 21, the inner bag 22' and the first reinforcing cloth members 23", the single cloth member 221' of the inner bag 22' is placed on the first body portion 211' of the bag body 21' so that the gas inlet hole 22c' of the inner bag 22' is aligned with the gas inlet hole 21a' of the bag body 21'. Thereafter, the first reinforcing cloth members 23" are placed in the stacked condition on the cloth member 221' of the inner bag 22' around the gas inlet hole 22c', and the first reinforcing cloth members 23 and the cloth member 221' of the inner bag 22' are circularly sewn to the first body portion 211 of the bag body 21' by using threads 251'. In sewing the second reinforcing cloth members 24' to the bag body 21', the second reinforcing cloth members 24' are individually placed on the first body portion 211 of the bag body 21' around the through-holes 21b' and then circularly sewn to the first body portion 211 of the bag body 21' around the through-holes 21b' by using threads 252'.

Figure 12A:
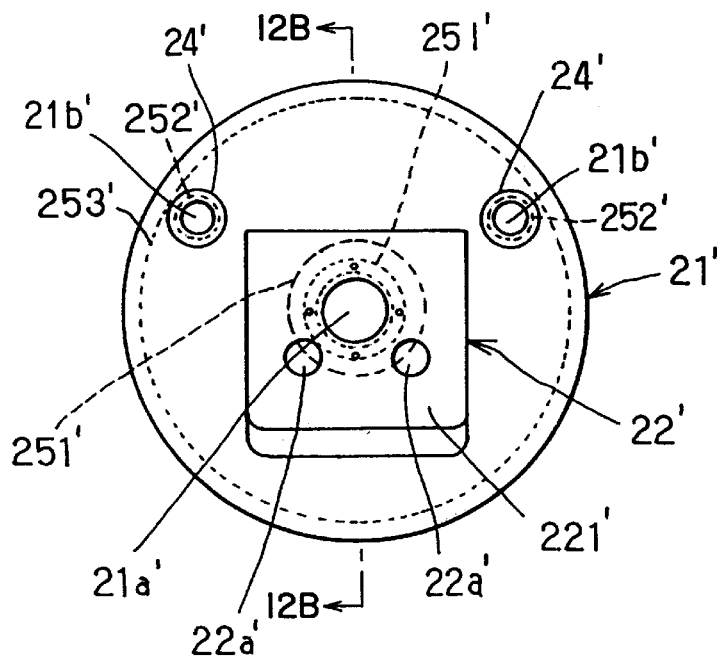
FIG. 12A is an elevational view showing a first step of a manufacturing method for the air bag according to the second embodiment.
Figure 12B:
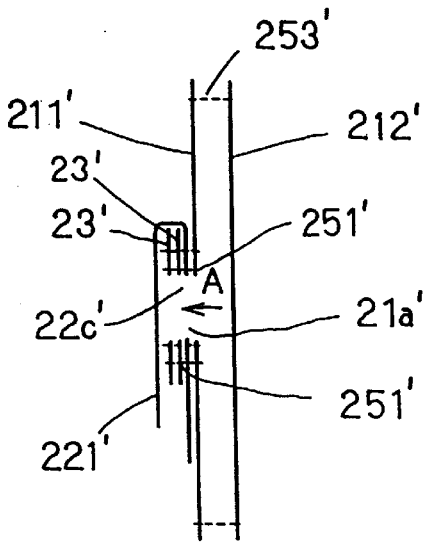
FIG. 12B is a partial cross-sectional schematic illustration of FIG. 12A.

Thereafter, as shown in FIGS. 12A and 12B, the first body portion 211 of the bag body 21' is placed in registration on the second body portion 212, and then circularly sewn thereto along their outlines by using a thread 253'. Thus, the first and second body portions 211' and 212' of the bag body 21' are formed into a bag.

Figure 13A:
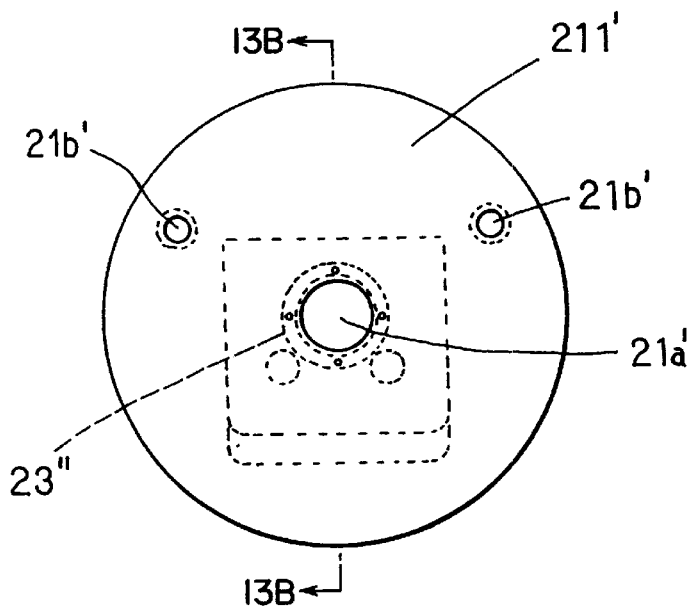
FIG. 13A is an elevational view showing a second step of a manufacturing method for the air bag according to the second embodiment.
Figure 13B:
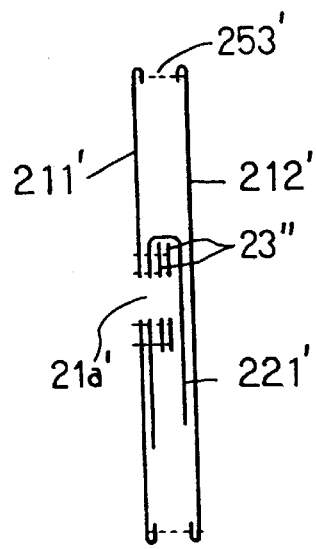
FIG. 13B is a partial cross-sectional schematic illustration of FIG. 13A.

Thereafter, the second body portion 212 of the bag body 21' is pulled at its center in the direction of the arrow A shown in FIG. 12B and passed through the gas inlet hole 21a'. Thus, the inner bag 22' is put into the bag body 21' as shown in FIGS. 13A and 13B. In this condition, the thread 253' appearing along the outlines of the first and second body portions 211' and 212' of the bag body 21' can be concealed inside the bag body 21.

Figure 14A:
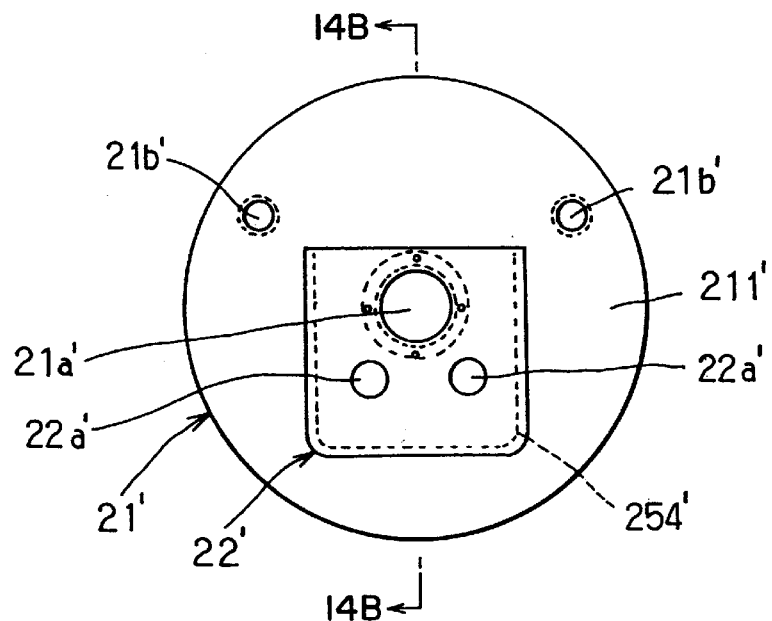
FIG. 14A is an elevational view showing a third step of a manufacturing method for the air bag according to the second embodiment.
Figure 14B:
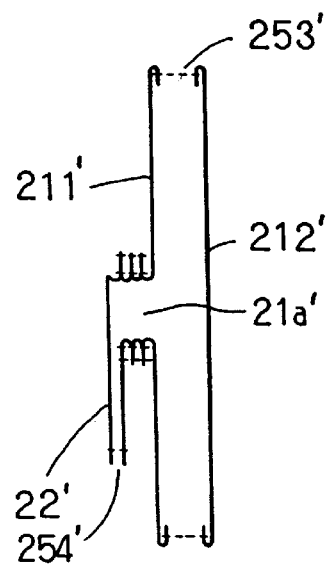
FIG. 14B is a partial cross-sectional schematic illustration of FIG. 14A.

Thereafter, as shown in FIGS. 14A and 14B, the inner bag 22' is pulled out of the bag body 21' through the gas inlet hole 21a', and a half portion of the inner bag 22' is put in registration on the other half portion thereof, and these half portions are sewn together along their outlines by using a thread 254'. Thus, the single body portion of the inner bag 22' is formed into a bag.

Figure 15A:
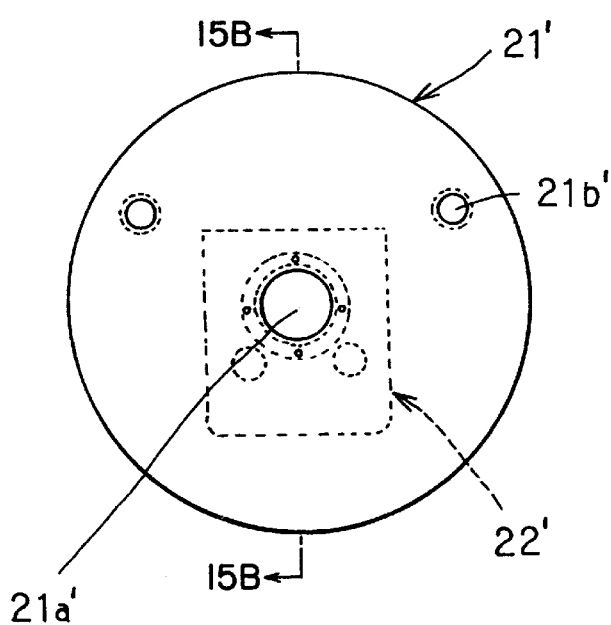
FIG. 15A is an elevational view showing a fourth step of a manufacturing method for the air bag according to the second embodiment.
Figure 15B:
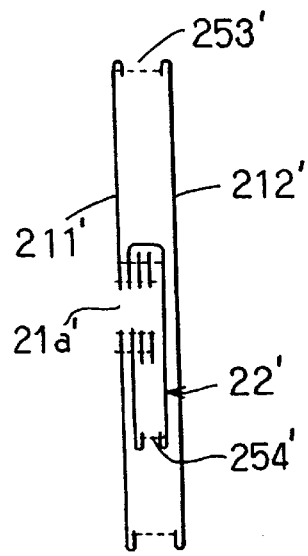
FIG. 15B is a partial cross-sectional schematic illustration of FIG. 15A.

Finally, as shown in FIGS. 15A and 15B, the inner bag 22' is put into the bag body 21' through the gas inlet hole 21a'. Thus, the air bag is completed.

Also according to the manufacturing method of the second embodiment, the bag body 21' and the inner bag 22' can be surely sewn together at their outer peripheries, and the inner bag 22' can be easily formed inside the bag body 21' without any special sewing device.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A manufacturing method for an air bag said method comprising the step of:
    a first step of sewing one pair of cloth members forming an inner bag to an outer bag in the vicinity of a common hole formed at an edge portion of said outer bag, said common hole being provided on said outer and inner bags commonly;
    a second step of sewing said outer bag to itself along a periphery thereof excluding said common hole to form said outer bag;
    a third step of passing said outer bag through said common hole formed at said edge portion of said outer bag to turn over said outer bag;
    a fourth step of sewing said one pair of cloth members together along a periphery thereof excluding said common hole to form said inner bag; and
    a fifth step of putting said inner bag into said outer bag through said common hole so that inner bag is disposed within said outer bag.

2. A manufacturing method for an air bag according to claim 1, wherein said first step includes a step of sewing a reinforcing cloth member to said outer bag in the vicinity of said common hole together with said one pair of cloth members.

3. A manufacturing method for an air bag according to claim 1, wherein said third step includes steps of:

putting said one pair of cloth members into said outer bag turned over; and
pulling said one pair of cloth members out of said outer bag through said common hole after said step of putting said one pair of cloth members into said outer bag turned over.

4. A manufacturing method for an air bag said method comprising the steps of:
    a first step of sewing a first cloth member of an inner bag to one end portion of a single cloth member of an outer bag;
    a second step of sewing a second cloth member of said inner bag to another end portion of said single cloth member of said outer bag;
    a third step of folding said single cloth member of said outer bag in such a manner that said first and second cloth members of said inner bag face outwardly from said single cloth member of said outer bag;
    a fourth step of sewing said folded single cloth member of said outer bag along a periphery thereof except at said one and another end portions sewn to said first and second cloth members of said inner bag to form said outer bag and to from a common hole;
    a fifth step of passing said outer bag through said common hole to turn over said outer bag;
    a sixth step of placing said first and second cloth members of said inner bag in registration and sewing said first and second cloth members together along peripheries thereof to form said inner bag; and
    a seventh step of putting said inner bag into said outer bag through said common hole.

5. A manufacturing method for an air bag according to claim 4, wherein said fourth step includes steps of:
    putting said first and second cloth members of said inner bag into said outer bag turned over; and
    pulling said first and second cloth members of said inner bag out of said outer bag through said common hole after said step of putting said first and second cloth members of said inner bag into said outer bag turned over.

6. A manufacturing method for an air bag said method comprising the steps of:
    a first step of aligning a common hole with a through-hole, said common hole being formed in a first body portion forming a part of an outer bag, said through-hole being formed in a single cloth member forming an inner bag;
    a second step of sewing said single cloth member said inner bag to said first body portion on one side of said first body portion around said common hole;
    a third step of placing a second body portion on the other side of said first body portion, said second body portion being substantially the same in size as said first body portion and forming another part of said outer bag;
    a fourth step of sewing said first and second body portions of said upper bag together along peripheries thereof to form said outer bag;
    a fifth step of passing said outer bag through said common hole to turn over said outer bag;
    a sixth of folding said single cloth member of said inner bag which is passed through from said common hole;
    a seventh step of sewing peripheries of said single cloth member of said inner bag to from said inner bag; and a eighth step of putting said inner bag into said outer bag through said common hole.

7. A manufacturing method for an air bag according to claim 6, wherein said third step includes steps of:

putting said single cloth member of said inner bag into said outer bag turned over; and pulling said single cloth member of said inner bag out of said outer bag through said common hole after said step of putting said single cloth member of said inner bag into said outer bag turned over.

* * * * *